United States Patent
Albrecht et al.

(10) Patent No.: US 6,211,798 B1
(45) Date of Patent: Apr. 3, 2001

(54) PROCESS AND GUIDANCE SYSTEM FOR ENSURING RELIABLE GUIDANCE OF A VEHICLE

(75) Inventors: Uwe Albrecht, München; Paul Garthwaite, Baldham; Gerd Waizmann, Riedering, all of (DE)

(73) Assignee: Mannesmann AG, Duesseldorf (DE)

( * ) Notice: Subject to any disclaimer, the term of this patent is extended or adjusted under 35 U.S.C. 154(b) by 0 days.

(21) Appl. No.: 09/068,728
(22) PCT Filed: Nov. 14, 1996
(86) PCT No.: PCT/DE96/02225
§ 371 Date: May 13, 1998
§ 102(e) Date: May 13, 1998
(87) PCT Pub. No.: WO97/18544
PCT Pub. Date: May 22, 1997

(30) Foreign Application Priority Data

Nov. 14, 1995 (DE) .............................. 195 44 157
Nov. 15, 1995 (DE) .............................. 195 44 381
Nov. 15, 1995 (DE) .............................. 195 44 382

(51) Int. Cl.$^7$ ...................................... G08G 1/123
(52) U.S. Cl. ..................... 340/990; 340/995; 340/988; 701/205; 701/207
(58) Field of Search .................................. 340/995, 990, 340/988; 701/200, 205, 207

(56) References Cited

U.S. PATENT DOCUMENTS

| | | | |
|---|---|---|---|
| 4,774,671 | * 9/1988 | Itoh et al. | 701/211 |
| 4,893,246 | * 1/1990 | Iihoshi et al. | 701/211 |
| 5,043,902 | * 8/1991 | Yokoyama et al. | 701/211 |
| 5,243,528 | * 9/1993 | Lefebvre | 701/211 |
| 5,523,765 | * 6/1996 | Ichikawa | 342/451 |

* cited by examiner

Primary Examiner—Benjamin C. Lee
(74) Attorney, Agent, or Firm—Cohen, Pontani, Lieberman & Pavane

(57) ABSTRACT

A process for guiding a vehicle along a route to a predetermined destination point includes determining a route in the form of consecutive path points which include at least geographic coordinates, determining the linear distance between a current location and the next path point and/or determining a change in the direction of travel between path points or at a path point. The process also provides a departure from route warning if (1) the linear distance is the next path point is more than a predetermined value; (2) a change in direction between path points lies outside of an allowed range or (3) a change in direction at a path point deviates from a target change in direction by more than a predetermined tolerance value.

12 Claims, 3 Drawing Sheets

PROCESS AND GUIDANCE SYSTEM FOR ENSURING RELIABLE GUIDANCE OF A VEHICLE

BACKGROUND OF THE INVENTION

1. Field of the Invention

The invention relates to a process and a guidance system for ensuring reliable guidance of a vehicle along a route to a predetermined destination point, in which the current location of the vehicle is ascertained and a route is determined in the form of consecutive path points comprising at least the geographic coordinates. The route is displayed to the vehicle driver in the form of driving instructions. Any departure from the preestablished route is signalled as soon as a preestablished decision criterion is met.

2. Description of the Prior Art

Vehicle guidance systems with visible and/or audible output devices for driving instructions to guide a vehicle along an advantageous determined route to a preestablished destination point are known. For drivers unfamiliar with an area, for example, these systems display the current location and the route, as well as all impending changes in direction, in the form of driving instructions based on digitalized road maps stored in the vehicle or externally.

DE 4039887 A1 discloses a process wherein the current location is ascertained by a locating system installed in the vehicle. A route leading from the current location to a preestablished destination point is determined by at least one external computer of an off-board navigational system. This route is transmitted to the vehicle in the form of a sequence of road segments to be traversed (a so-called guide vector chain), together with a road map of the immediate surroundings, and is displayed on a display device. The external computers are installed in spatially distributed beacons and can also be connected to a traffic computer. The guide vector chain comprises the geographic coordinates of the road segments to be traversed, and thus makes it possible to compare these geographic coordinates with the current location of the vehicle. Based on the results of this comparison, it is possible to display the current location of the vehicle, together with driving instructions, to the driver on the display device, and thus to successively guide the driver to the preestablished destination. Thus, in this process, guidance is always provided starting from the current location of the vehicle, regardless of whether or not the vehicle has deviated from the preestablished route of travel.

Although this process is suitable for guiding vehicles with the help of an off-board navigation system, in particular, it does not detect deviations from the preestablished route and thus does not communicate such deviations to the driver. In this process, only when a beacon is passed does the computer select, based on the current location of the vehicle (or the beacon), at least one guide vector chain leading to the preestablished destination from a guide vector chain collective. The selected guide vector chain is then transmitted to the vehicle and displayed to the driver directly or in the form of driving instructions. This is how "error correction" is undertaken in the event of deviations from the original route.

DE 36 45 100 C2 discloses a navigation system for motor vehicles in which a map memory device must be carried in the vehicle and the route is established as a sequence of so-called "highlighted" points. This system has sensors in the vehicle that ascertain the direction of travel as well as the path that has been travelled by the vehicle. The system is therefore able to reproduce the geometric shape of the traversed path, so that, starting from an initial point, the current location of the vehicle is ascertained. Due to the limited accuracy of the data collection, there is inevitably an ongoing summation of error variables. To prevent these errors from assuming uncontrollable orders of magnitude in the current location, this navigation system, when a new "highlighted" path point is reached, replaces the data of the computed location with the actual location data of the path point reached. The fact that a new path point has indeed been reached is recognized because the length of the path between each two consecutive "highlighted" path points (i.e., the road distance) is recorded in the map memory device as a target value. The path actually travelled by the vehicle between two such path points is continually subtracted from this target value. When the difference obtained in this manner approaches zero, the "added up" location is supposed to correspond to the location of the aimed-at path point preestablished by the map memory device. If, instead, an impermissibly large difference results, the system issues a warning that the predetermined route has been deviated from. Such a warning is also issued as soon as the "added up" location of the vehicle, during a trip between the two adjacent "highlighted" path points, leaves a defined error zone around these path points. The shape of this error zone is substantially rectangular. Its width (at a right angle to the road) is half as large as the linear distance between the two path points. In the event of unplanned detours, this system, due to the relatively broad error zone between the consecutive path points, may not recognize until very late (for example, not until the next path point should have been reached) deviations that have occurred from the preestablished route.

SUMMARY OF THE INVENTION

The object of the present invention is to indicate a process for the reliable guidance of a vehicle along an advantageous route determined, in particular, with the help of an off-board navigation system, and a guidance system to implement this process, in which, with the least possible technical expense, deviations from the preestablished route are recognized as quickly as possible in the vehicle, without a digital road map or the like having to be carried in the vehicle for this purpose.

According to a first aspect of the present invention, this object is attained in that a route is initially determined in the form of consecutive path points. The current location of the vehicle is continually ascertained by the guidance system in the vehicle based on data or signals that are transmitted wirelessly to the vehicle guidance system. Based on the current determined location, the linear distance to the next path point that the vehicle is to pass on its route is continually compared with a predetermined minimum value. The predetermined minimum value initially corresponds to the linear distance (straight line) of the particular sequential path points. The linear distance can differ significantly (especially on curving roads) from the actual length of the route between these path points. The predetermined minimum value is replaced by a calculated linear distance when the linear distance is smaller than the previous predetermined minimum value. Departure from the preestablished route is signalled to the driver when the calculated linear distance exceeds the current minimum value by a predetermined threshold value. As soon as the next path point is reached, the linear distance to the next path point is set the same way as the initial predetermined minimum value.

The process according to the invention makes it possible, with little technical expense, to immediately detect deviations from a preestablished route and to display these to the driver without a digital road map of suitable resolution having to be carried in the vehicle. The guidance system in the vehicle can be very simply constructed, especially when the route is determined with the help of an off-board navigation system and transmitted to the vehicle in the form of path points. In such cases, the guidance system needs only an input and output unit, a location sensor system and a data communications device. Advantageously, the path points of the route comprise at least the geographic coordinates, so that a direct comparison with the location data of the vehicle is possible.

If guidance is carried out by an off-board navigation system that determines a suitable route and transmits it to the vehicle in the form of path points, especially reliable guidance is attained by means of the simple process according to the invention, because any incorrect turn will be immediately recognized in the vehicle, so that, very soon after a wrong route is taken, it can be identified as such and then corrected. Especially high reliability in recognizing wrong routes can be attained when the process according to the inventions combined with a process for recognizing an incorrect route based on other principles. For example, one process or the other can be used for certain predetermined segments, depending on which process is best suited for the characteristics of the segment in question.

According to a first embodiment of the invention, a guidance system for the reliable guidance of a vehicle that immediately recognizes any deviation from a preestablished route comprises an input device, particularly for entering a destination point, and a location determination device for determining the current geographic location of the vehicle. To ascertain the vehicle location, a remote location determination device processes data or signals transmitted wirelessly to the vehicle. A route connecting the current location and the destination point is determined in the vehicle by the guidance system or outside the vehicle, and is then stored in a memory of the guidance system in the form of path points. A distance determination/comparison device permits the linear distance between the current vehicle location and the next path point that the vehicle will pass on its route to be ascertained continually and compared with a preestablished minimum value. When the calculated distance exceeds the minimum value by a preset threshold value, a warning signal can be triggered by the distance determination/comparison device to alert the driver of the vehicle that he has deviated from the preestablished route. Measures to correct the route may also be initiated by a suitable signal. In contrast, after a comparison, the preset minimum value is replaced by the determined linear distance when the determined distance is smaller than the minimum value, i.e., under these conditions, the most recently ascertained linear distance becomes the new minimum value.

To account for the specific form of the route leading to the destination, it is possible to set an individual threshold value for individual sections of the route. This is advantageously done by a device with the digital road map for determining the route, i.e., in the case of an off-board system, a vehicle-external traffic computer.

Preferably, an on-board computer, which is preferably embodied as a calculating program, controls the distance determination/comparison device. It is especially suitable, in the guidance system with an off-board navigation system, for the latter to also be equipped with a communications device for data exchange. The communications device can serve to transmit the route in the form of path points from the off-board navigation system to the guidance system. Advantageously, the communications device is embodied as a mobile telephone. The embodiment of the input device as a keyboard has proved to be a universal solution. When embodied as a receiver for satellite navigation signals, the location determination device is small and easy to house. The invention proposes that, upon any deviation from the preestablished route, a preferably visual warning signal be displayable on the display device, in particular, together with driving instructions, by means of the on-board computer. The driving instructions can contain detailed information on the deviation from the preestablished route. Of course, the warning signal could also be issued in a different form such, for example, as an audible signal.

According to a second embodiment of the invention, the route is initially determined in the form of consecutive path points comprising at least the geographic coordinates. For example, the current direction of travel and the current location of the vehicle are continually found between the path points by means of locating or directional sensors. The current direction of travel is compared with the previous direction of travel, ascertained a short time before, to determine the change in direction. It is especially advantageous to use data or signals transmitted wirelessly to the vehicle to determine the current location and/or direction of travel (e.g., signals of a satellite navigation system). A deviation from the preestablished route exists when the size of the ascertained change in the direction of travel lies outside of a preset value range. In such cases, the driver is notified by signal that he has departed from the preestablished route, or else measures to correct the route are initiated.

The permissible value ranges for changes in direction can be established for all segments of the road network at the same time. In some cases, however, it is advantageous to establish these values individually for individual sections. The path points determining the route can be at different distances from each other. Their advantageous distance is based on the geometric course of the road (curves, possible turns, etc.).

The process according to the second embodiment of the invention allows deviations from a preestablished route of travel to be immediately recognized and displayed to the driver with little technical expense and without a digital road map of suitable resolution having to be carried in the vehicle. The guidance system in the vehicle can be constructed especially simply when the route is determined outside the vehicle and transmitted to the vehicle in the form of path points. In such cases, the guidance system needs only an input and output unit, a location sensor system, and a data communications device. Because the path points of the route comprise at least the geographic coordinates, a direct comparison with the geographic location data of the vehicle is possible.

Advantageously, the change in direction is ascertained from direction of travel values determined as the average values of the direction of travel for short predetermined sections. It is thereby advantageous, particularly for the purpose of increasing, in a simple manner, the reliability of the information gained from the process, to determine the current direction of travel as the average direction of travel in a predetermined first section, one of whose end points forms the current geographic location, and to determine the previous direction of travel as the average direction of travel in a preestablished second section, whereby the first section advantageously immediately follows the second section. It is especially advantageous for the first and second sections to have the same length. As an alternative, it is also possible for the two sections to partially overlap each other.

When guidance is carried out by an off-board navigation system that determines a favorable route of travel and transmits it to the vehicle, the very simple process according to the invention nonetheless ensures reliable guidance, whereby a wrong route can be recognized and corrected very quickly after being embarked upon. Especially high reliability in recognizing wrong routes can be attained when the process according to the invention is combined with a process for recognizing wrong routes based on different principles, so that one process or the other is used, for example, for certain predetermined sections, depending on which process is best suited for the characteristics of the section in question.

A guidance system according to the second embodiment of the invention for the reliable guidance of a vehicle, which system immediately recognizes any departure from a pre-established route, comprises an input device for entering a destination point and a location determination device for determining the current location. A route connecting the current location and the destination point is determined in the vehicle by the guidance system or outside of the vehicle and is stored in a memory device of the guidance system in the form of path points. A change in direction determination device allows the current direction of travel of the vehicle to be continually determined between the path points and then compared with the direction of travel ascertained a short time before. Specifically, the change in direction determination device can issue a control signal when the size of the ascertained change in direction lies outside a preestablished value range that can contain, in particular, a preestablished maximum value. Thus, any departure from the preestablished route can be displayed to the driver, having been triggered, for example, by a warning signal.

Preferably, there is an on-board computer controlling the change in direction determination device, which preferably is embodied as a calculating program. In a guidance system with an off-board navigation system, it is especially suitable for the off-board navigation system to also be equipped with a communications device for data exchange. The communications device allows the travel route to be transmitted to the guidance system by the off-board navigation system in the form of path points. Advantageously, the communications device is embodied as a mobile phone. The embodiment of the input device as a keyboard has proved to be a universal solution. The location determination device is small and easy to house when it has a receiver for satellite navigation signals. These satellite signals are also suitable for determining the current direction of travel. Alternatively, the direction of travel can be found, for example, with the help of a magnetic field probe. The invention proposes that upon departure from the route of travel, an optical warning signal be displayable on the display device, in particular, together with driving instructions, by means of the on-board computer. The driving instructions can contain detailed information on the deviations from the preestablished route.

According to a third embodiment of the invention, the route is again initially determined in the form of consecutive path points, which comprise at least the geographic coordinates. Those path points that are also turn points, i.e., path points that are located within intersections or junctions where a change in direction is planned, are each assigned a target turn angle. Further, the current location and the current direction of travel of the vehicle are continually ascertained. It is especially advantageous to use data or signals transmitted wirelessly to the vehicle to find the current geographic location and/or direction of travel (e.g., signals of a satellite navigation system). When the vehicle passes a path point having a target turn angle, the turn angle of the vehicle is ascertained. This ascertained turn angle is then compared with the target turn angle. If the found turn angle deviates by more than a predetermined tolerance value from the target turn angle, the driver is notified by signal of a departure from the preestablished route, or else measures to correct the route are initiated. The tolerance value can be preestablished in a blanket fashion or can be stored individually for all or some path points together with the turn angle.

The process according to the third embodiment of the invention allows any deviations from a preestablished route to be recognized and reported to the driver immediately with low technical expense and without a digital road map of suitable resolution having to be carried in the vehicle for this purpose. The guidance system in the vehicle can be constructed in an especially simple manner when the route is determined outside of the vehicle and transmitted to the vehicle in the form of path points. The guidance system in such cases needs only an input and output unit, a locating sensor system and a data communications device. Because the path points of the route comprise at least the geographic coordinates, a direct comparison with the geographical location data of the vehicle is possible. The actual location of the vehicle is preferably ascertained on the basis of data or signals transmitted wirelessly to the vehicle, i.e., by radio direction finding, especially preferably by satellite navigation.

In one embodiment of the third embodiment of the invention, the turn angle and the target turn angle are relative angles in relation to the change in direction of the vehicle at the given intersection or junction. In a further embodiment, the turn angle and the target turn angle are absolute angles in relation to the direction of travel (directional point) after the particular intersection or junction. However, it is also possible to advantageously combine the two embodiments of the invention in such a way that some intersections or junctions are assigned the target change in direction as the target turn angle, while other intersections or junctions are assigned the target direction of travel as the target turn angle.

Advantageously, the direction of travel is ascertained as an average value in that the direction of travel at each of several directly consecutive geographic locations is determined. To reduce random distributions of the direction of travel values and obtain only the main direction of travel of the vehicle, the arithmetic average value is calculated from these directions of travel (e.g., continually, as a sliding average value). Preferably, the change in direction at one path point is found by calculating the difference from the main direction of travel (i.e., the average direction of travel) directly before and directly after the path point.

When guidance is carried out by an off-board navigation system that determines a favorable route and transmits it to the vehicle in the form of path points, reliable guidance is attained by the process despite the low technical expense. Wrong routes are recognized a very short time after being embarked upon, and can then be corrected. Especially high reliability in recognizing a wrong route can be attained when the present process is combined with a process for recognizing wrong route based on other principles, so that, for example, one process or the other is used for certain predetermined sections, depending on which process is best suited for the characteristics of the section in question. In particular, the combined use of the process according to the three embodiments of the present invention is advantageous.

A guidance system according to the third embodiment of the invention for the reliable guidance of a vehicle, which system can immediately recognize any departure from a preestablished route again comprises an input device, in particular, for entering a destination point, and a location determination device for determining the current location of the vehicle. A route connecting the current location and the destination point, which can be determined in the vehicle by means of the guidance system or outside of the vehicle, is stored in a working memory of the guidance system. The route is stored in the form of consecutive path points, which comprise at least the geographic coordinates. At least for those intersections or junctions where a change in direction is planned, a target turn angle is assigned to the associated path point lying within the intersection or junction, and this target turn angle is also stored in the working memory. A direction of travel determination device and a change in direction determination device are also provided and serve, when the vehicle passes a path point to which a target turn angle is assigned, to ascertain the actual turn angle of the vehicle. A comparison device is provided to compare the ascertained turn angle with the target turn angle. A warning signal that signals a departure from the preestablished route to the driver, for example, can be triggered when the direction of travel deviates from the target direction of travel or when the change in direction deviates from the target change in direction by more than a predetermined tolerance value.

Preferably, an on-board computer controls the direction of travel determination device and the change in direction determination device, which are preferably embodied as a calculating program. It is especially suitable, in the guidance system with an off-board navigation system, for the latter to also be equipped with a communications device for data exchange. The communications device allows the route to be transmitted by the off-board navigation system to the guidance system in the form of path points. Advantageously, the communications device is embodied as a mobile telephone. The embodiment of the input device as a keyboard has proved to be a universal solution. The geographic location determination device is small and easy to house when it has a receiver for satellite navigation signals. These satellite signals are also suitable for ascertaining the current direction of travel. Alternatively, the direction of travel can be determined, for example, with the help of a magnetic field probe. The invention proposes that, upon any departure from the route, a preferably visual warning signal be displayable on the display device, in particular, together with driving instructions, by means of the on-board computer. The driving instructions can contain detailed information on the deviations from the preestablished route. Of course, the warning signal can also be emitted in other ways such, for example, as with an audible signal.

BRIEF DESCRIPTION OF THE DRAWINGS

In the drawings, wherein like reference characters denote similar elements.

DETAILED DESCRIPTION OF THE PREFERRED EMBODIMENTS

Figure 1:
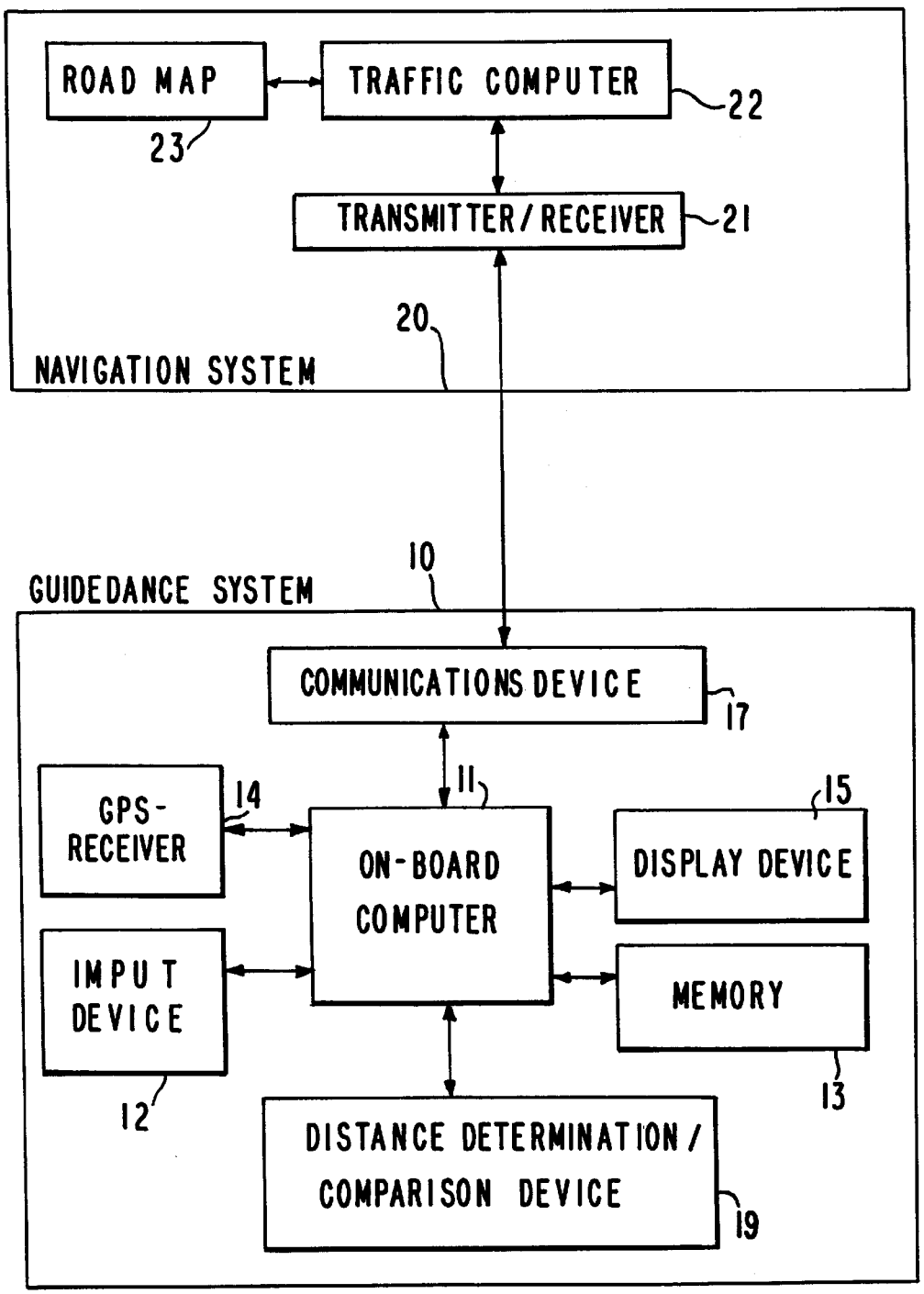
FIG. 1 is a block diagram of an embodiment of a vehicle navigation system according to the present invention.

A vehicle navigation system shown in FIG. 1 comprises a guidance system 10 installed in the vehicle. The guidance system 10 has an on-board computer 11, by means of which the other components 12 to 19 of the guidance system 10 are connected to one another and can be controlled. An input device 12 in the form, for example, of a keyboard permits the input of the destination point, for example, a street name. The specified destination point can be stored in the memory 13 and is thus available to be called up as needed. To determine the current vehicle location, the guidance system 10 has a receiver 14 of a satellite navigation system (e.g., GPS=Global Positioning System), which receiver 14 is also connected in terms of data transmission to the on-board computer 11. As needed, the current location which is continually determinable from the received satellite signals can be stored by the on-board computer 11 in the memory 13. In addition, the most favorable determined route, based on the current location and the input destination point, is stored in the memory 13 in the form of path points that contain the geographic data. As FIG. 1 shows, the guidance system 10 has a display device 15 equipped with an visual display, such, for example, as a video screen by means of which the route can be displayed, together with the driving instructions, under the partial or complete control of the on-board computer 11. The current vehicle location is thereby displayed highlighted by color, for example. A distance determination/comparison device 19 determines the linear distance from the current vehicle location to the next path point of the two path points between which the vehicle is located at a given moment. The distance determination/comparison device 19 compares the determined linear distance with a preset minimum value. A warning signal can be triggered, specifically, when the determined linear distance exceeds the preset minimum value by a preset threshold value. To account, for example, for the form of the best route leading to the destination point, an individual threshold value is provided for each individual section of the route. Thanks to the warning signal, a suitable audible signal for the driver can be produced by the on-board computer 11 and/or suitable driving instructions can be issued via the visual display of the display device 15. The preset minimum value can be replaced by the current determined linear distance when the previous minimum value is greater than this determined linear distance. To minimize the equipment-related costs of the guidance system 10, the latter is connected to a communications device 17, particularly a mobile phone, by means of which a data connection can be established to an off-board navigation system 20 arranged outside the vehicle. As FIG. 1 shows, the off-board navigation system 20 is equipped with a transmitter/receiver 21 for data exchange with the guidance system 10. The navigation system 20 contains a traffic computer 22, which has access to a digital road map 23 as well as to current traffic information.

To implement guidance of the vehicle, the driver enters a destination point via the keyboard of the input device 12. The destination point is transmitted, together with the current location of the vehicle as determined by means of the receiver 14, to the traffic computer 22 of the off-board navigation system 20 by means of the communications device 17. Based on the digital road map 23, the traffic computer 22 then determines a favorable route to the given destination point. This route is transmitted back to the guidance system 10 in the form of path points and stored in the memory 13 under the control of the on-board computer 11. The current vehicle location is determined on the basis of the signals received by the receiver 14, so that the distance determination/comparison device 19 can ascertain the two directly consecutive path points between which the vehicle is located at the given moment. Further, the distance determination/comparison device 19 continually has available the current location of the vehicle as found by means of the receiver 14. From this, the distance determination/comparison device 19 continually calculates the linear distance (straight line) from the current location to the next path point that the vehicle will pass on its route, and compares this distance to a preset minimum value. If the calculated distance is greater than the minimum value, the preset minimum value is replaced by the calculated distance. Moreover, if the calculated linear distance for this section of the route exceeds the previous minimum value by a preset threshold value, the distance determination/comparison device 19 triggers a warning signal to signal a departure from the preset route. Of course, it is also possible, when a warning signal is triggered, to determine a new route to the destination point and guide the vehicle along this route without explicitly informing the driver that a wrong route was taken. The threshold value can also be used to adjust the process to the sometimes very complicated course of a given route. This is advantageous, for example, when the distance to the next path point, i.e., the straight-line connection between the current location of the vehicle and the next path point, temporarily increases, due to a curved or looping section, even though the segment still to be travelled to this path point continues to grow shorter. The warning signal alerts the on-board computer 11 to emit a suitable signal to the driver. The signal can be emitted acoustically, in the form of a warning tone or a voice message, as well as optically on the display device 15. The driver can obtain, especially by means of the visual display, for example, additional information on the deviation from the preset route as well as driving instructions from the guidance system 10. In an alternative embodiment of the invention, the distance determination/comparison device 19 is embodied as a calculating program, which can be called up by the on-board computer 11.

Figure 2:
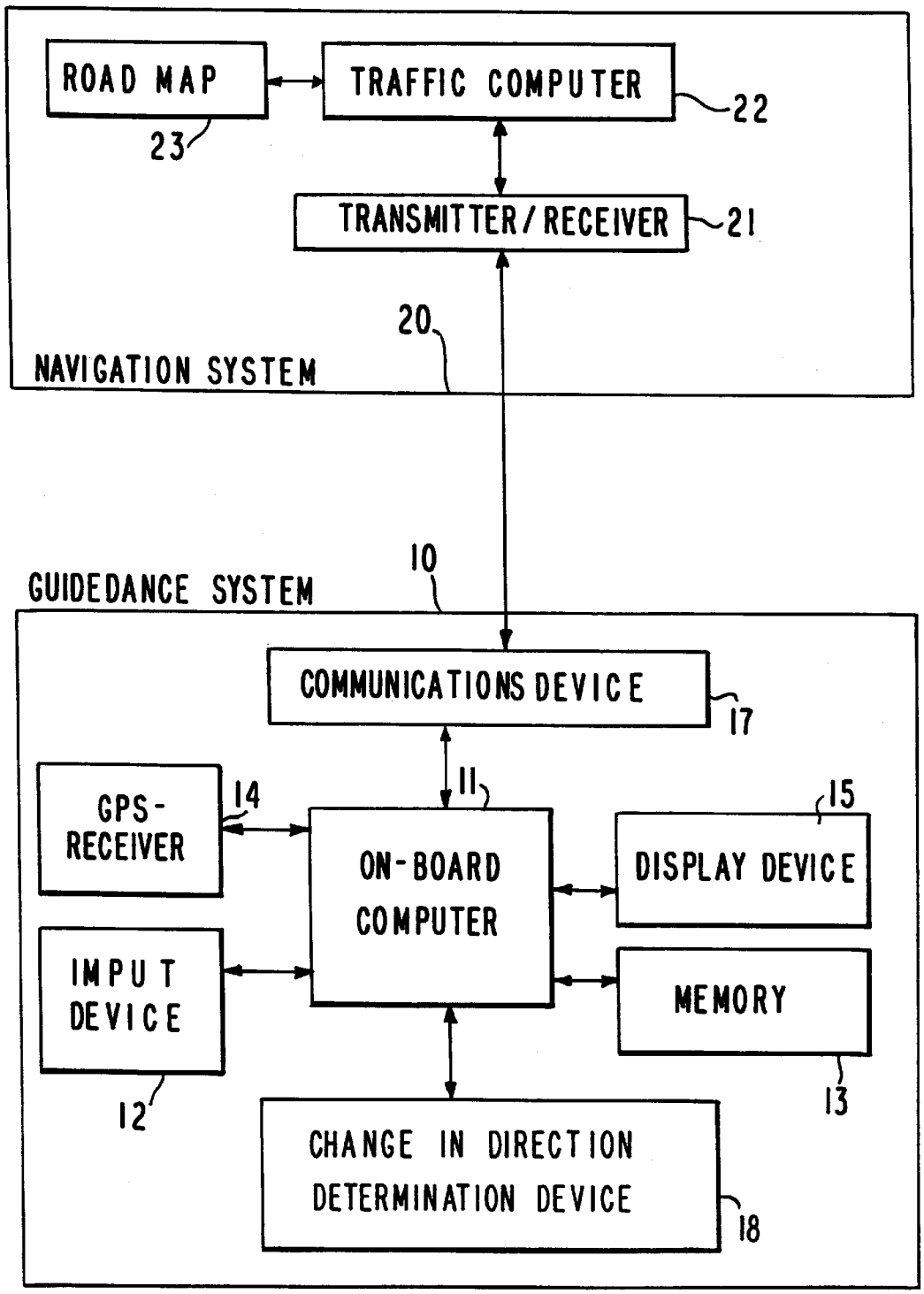
FIG. 2 is a block diagram of another embodiment of the vehicle navigation system according to the present invention.

The embodiment of the present invention shown in FIG. 2 largely agrees with that in FIG. 1 with respect to the basic functions, so that reference can be made to FIG. 1 and only differences therefrom are discussed below.

In this embodiment of the invention, a change in direction determination device 18 is provided instead of the distance determination/comparison device 19 shown in FIG. 1. During the trip, the change in direction determination device 18 continually receives the current location of the vehicle as determined by the receiver 14. From this, the change in direction determination device 18, to ascertain a change in direction between path points, continually calculates the current direction of travel, compares the calculated current direction of travel with a previously ascertained direction of travel, and finds the change in direction in the form of the difference between the directions. Preferably, the change in direction is determined from direction values that are found as the average value of directions for preestablished short sections of the route. Advantageously, the sections for which direction data is found should have the same length. Averaging is done in such a way that the directions of travel at locations directly following one another in a preestablished section of 50 m, for example, are found, and the average value is calculated from these found directions of travel. Alternatively or in addition to this, of course, the direction of travel can be determined by the receiver 14 of the satellite navigation system using an internal calculation process. The difference between the current direction of travel and the previous direction of travel is preferably found in that the current direction of travel is determined as the average direction of travel in a preestablished first section, one of whose end points is the current vehicle location, while the previous direction of travel is determined as the average direction of travel in a preestablished second section, whereby the first section directly follows the second section. In certain cases, it can be advantageous for the two sections to overlap or be separated from each other by a distance. The direction of travel and the change in direction can also be determined in an ongoing (sliding) manner. When the size of the change in direction exceeds a preset maximum value, a departure from the preestablished route is signalled by a suitable warning, as already described in reference to FIG. 1.

Figure 3:
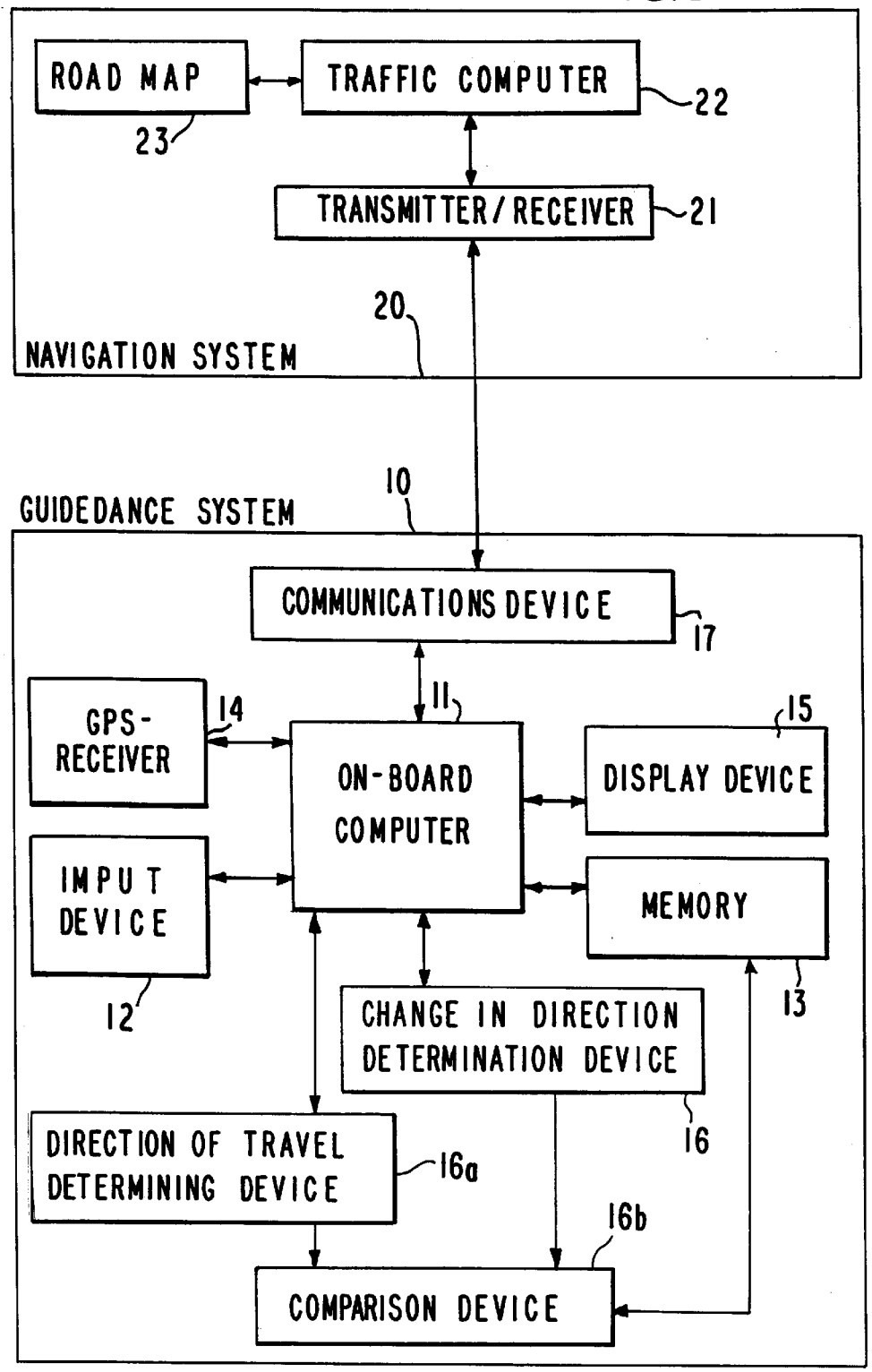
FIG. 3 is a block diagram of yet another embodiment of the vehicle navigation system according to the present invention.

The embodiment of the present invention shown in FIG. 3 agrees largely with that shown in FIG. 1, so that again the earlier description is referred to and, for the most part, only the differences therefrom are discussed below.

The path point data stored in the memory 13 to define the route comprise not only the geographic coordinates of the locations to be passed, but also, at least for path points in the area of intersections or junctions where a change in direction is to occur, a target turn angle. The target turn angle is either a relative angle which is the change in direction of the vehicle at the given intersection or junction, or an absolute angle which is the direction of travel of the vehicle directly after the particular intersection or junction. As FIG. 3 shows, a change in direction determination device 16 as well as a direction of travel determination device 16a and a comparison device 16b are provided instead of the distance determination/comparison device 19 shown in FIG. 1. The direction of travel is determined by the direction of travel determination device 16 for path points to which an absolute angle is assigned as the target turn angle. Alternatively or in addition thereto, of course, the direction of travel can be determined by the receiver 14 of the satellite navigation system using internal calculation processes. The determination of the change in direction for path points to which a relative angle is assigned is carried out by the change in direction determination device 16a. The direction of travel determination device 16 and the change in direction determination device 16a are thereby the essential components of the turn angle determination device. To compare the direction of travel with the target direction of travel corresponding to the target turn angle, or to compare the change in direction with the target change in direction corresponding to the target turn angle, a comparison device 16b is provided, and the respective target values can be called up from the memory 13. As in FIGS. 1 and 2, a warning signal to signal a departure from the preestablished route can be triggered by the comparison device 16b when the direction of travel deviates from the target direction of travel or when the change in direction deviates from the target change in direction by more than a preset tolerance value.

To initiate guidance of the vehicle, the destination point is entered via the keyboard of the input device 12. The destination point, together with the current location of the vehicle as determined by means of the receiver 14, is transmitted by the communications device 17 to the traffic computer 22 of the off-board navigation system 20. Based on the digital road map 23, the traffic computer 22 then determines a favorable route to the preestablished destination point. This route is transmitted back to the guidance system 10 in the form of path points. Path points that lie in the area of intersections or junctions where a change in direction is planned, i.e., path points that are also turn points of the route, are assigned, as a target turn angle, either a target change in direction (relative angle) or a target direction of travel (absolute angle). The path points, along with the target turn angle (target change in direction, target direction of travel), are stored in the memory 13 under the control of the on-board computer 11. The receiver 14 continuously determines the current location and the current direction of travel of the vehicle; it is also possible to provide additional direction sensors for determining direction of travel. The average direction of travel of the vehicle is thus determined in that the current directions of travel are found at a predeterminable number of locations (e.g., 50) that follow one another directly in the direction of travel, and the average value is calculated from these directions. Instead of a predetermined number of locations, a short section can be predetermined, and the average value of the respective directions of travel at each vehicle location in this section can be found. In this way, the direction of travel determination device 16 ascertains the average direction following the path points to which an absolute target turn angle is assigned. When the vehicle passes a path point to which a relative target turn angle or a target change of direction is assigned, the change in direction determination device 16a ascertains the change in direction by finding the difference between the average directions of travel of the vehicle before and after the path point in question. The ascertained direction of travel or change in direction is compared with the corresponding target value in the comparison device 16b. If the ascertained direction of travel deviates from the target direction of travel or if the change in direction deviates from the target change in direction by more than a preset tolerance value, a departure from the preset route is signalled, in that a warning signal to this effect is triggered by the comparison device 16b.

Alternatively, it is also advantageously possible to assign both a relative and an absolute angle to individual path points or to all path points where a change in direction is planned, and to ascertain both the direction of travel and the change in direction for these path points. In such an embodiment of the invention, after the comparison with the target values, it is decided, on the basis of decision criteria that are preestablished or can be established in dependence on certain conditions, whether a departure from the route has occurred. This variant has advantages especially in relatively complicated intersection situations (e.g., an autobahn interchange), because two testable target parameters are available and can be taken into account in the decision. Thus, the relative turn angle can be checked initially in the interchange area; then, at a predetermined distance after the interchange (i.e., the path point),the direction of travel of the vehicle can be compared to the target direction of travel. This makes it possible, for example, to unambiguously recognize turn angles of 270° at a looping turn.

The direction of travel and the change in direction can also be determined in continuous (sliding) fashion, and can then be compared with the assigned target value stored in the memory only when a given path point is reached. In addition, a distance rule can be established, which specifies the distance from the path point at which the average direction of travel should be ascertained. This is especially advisable when the determination of the vehicle location has a non-negligible inaccuracy, as is the case, for example, in a GPS navigation system, due to the consciously built-in distortion of the transmitted signals.

List of Reference Items 10 guidance system
11 on-board computer
12 input device
13 memory
14 receiver of navigational satellite system
15 display device
16 direction of travel determination device
16a change in direction determination device
16b comparison device
17 communications device
18 change in direction determination device
19 distance determination/comparison device
20 off-board navigation system
21 transmitter/receiver
22 traffic computer
23 digital road map

What is claimed is:

1. A process for guiding a vehicle to a destination point, comprising the steps of:

determining a route to the destination point in the form of consecutive path points that comprise at least geographic coordinates;

displaying the route to a driver of the vehicle;

continuously determining a current location of the vehicle based on one of data and signals transmitted to the vehicle using a wireless transmission from a remote location;

continuously calculating a linear distance from the current location of the vehicle to a next one of the consecutive path points to be passed by the vehicle;

comparing the calculated linear distance to a preestablished minimum value;

replacing the preestablished minimum value with the calculated linear distance if the preestablished minimum value exceeds the calculated linear distance in the step of comparing; and signalling a departure from the route if the calculated distance exceeds the preestablished minimum value by a predetermined threshold value.

2. The process of claim 1, wherein said step of determining a route comprises using an off-board navigation system and transmitting the route from the off-board navigation system to the vehicle using a wireless transmission.

3. A vehicle guidance system for automatically recognizing a departure from a vehicle route, comprising:

an input device for manual input of a destination point to said vehicle guidance system;

a memory connected to said input device and storing said destination point;

a location determination device for receiving one of data and signals transmitted to the vehicle from an off-board source and determining a current location of the vehicle from said one of data and signals;

a route determination device for determining the vehicle route from the current location to the destination point and connected to said memory for storing said vehicle route in the form of consecutive path points comprising geographic coordinates;

a display device for displaying driving instructions based on said route and said current location;

a distance determination/comparison device for continuously determining a linear distance between said current location and a next one of said consecutive path points and for comparing said determined linear distance to a predetermined minimum value, wherein said predetermined minimum value is replaced by the determined linear distance if the predetermined minimum value exceeds the determined linear distance, and wherein said distance determination/comparison device triggers a warning signal if said determined linear distance exceeds the predetermined minimum value by more than a predetermined threshold value.

4. The vehicle guidance system of claim 3, further comprising an on-board computer for controlling said distance determination/comparison device.

5. The vehicle guidance system of claim 4, wherein said distance determination/comparison device comprises a calculating program.

6. The vehicle guidance system of claim 3, wherein said vehicle route comprises a plurality of sections, one of said plural sections between each adjacent pair of said consecutive path points, and said predetermined threshold is set to a different specific value for each said plural sections of said vehicle route.

7. The vehicle guidance system of claim 3, further comprising a communications device for exchanging data with an off-board navigation system.

8. The vehicle guidance system of claim 7, wherein said communications device comprises a mobile telephone.

9. The vehicle guidance system of claim 3, wherein said input device comprises a keyboard.

10. The vehicle guidance system of claim 3, wherein said location determination device comprises a receiver for a satellite navigation system.

11. The vehicle guidance system of claim 3, wherein said display device comprises a video display.

12. The vehicle guidance system of claim 11, wherein said visual display device outputs said travel instructions and said warning signal.

* * * * *